United States Patent
Espelien et al.

(10) Patent No.: US 11,035,382 B2
(45) Date of Patent: Jun. 15, 2021

(54) REFRIGERANT GAS COOLING OF MOTOR AND MAGNETIC BEARINGS

(71) Applicant: TRANE INTERNATIONAL INC., Davidson, NC (US)

(72) Inventors: Christopher Espelien, Holmen, WI (US); Joseph M. Heger, West Salem, WI (US); Daniel A. Strange, La Crosse, WI (US); Russell T. Abbott, Caledonia, MN (US); Robert S. Bakkestuen, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 106 days.

(21) Appl. No.: 15/873,560

(22) Filed: Jan. 17, 2018

(65) Prior Publication Data

US 2019/0063461 A1 Feb. 28, 2019

Related U.S. Application Data (63) Continuation-in-part of application No. 15/686,905, filed on Aug. 25, 2017, now Pat. No. 10,527,174.

(51) Int. Cl.
*F04D 29/58* (2006.01)
*F04D 25/06* (2006.01)
(Continued)

(52) U.S. Cl.
CPC .......... *F04D 29/584* (2013.01); *F04B 39/062* (2013.01); *F04D 25/06* (2013.01);
(Continued)

(58) Field of Classification Search
CPC .... F25B 31/006; F25B 31/008; F01D 25/125; F01D 9/065; F04D 29/5806;
(Continued)

(56) References Cited

U.S. PATENT DOCUMENTS 2,776,542 A * 1/1957 Cooper ................. F25B 31/008
62/197
2,973,136 A * 2/1961 Greenwald ............. F01D 25/16
417/407

(Continued)

FOREIGN PATENT DOCUMENTS

WO 2016/147485 A1 9/2016
WO 2016/147585 9/2016

OTHER PUBLICATIONS

Extended European Search Report; European Patent Application No. 18189704.2, dated Jan. 21, 2019 (10 pages).
(Continued)

*Primary Examiner* — Atif H Chaudry
(74) *Attorney, Agent, or Firm* — Hamre, Schumann, Mueller & Larson, P.C.

(57) ABSTRACT

A variable orifice flow device controls the flow of refrigerant into a compressor motor housing in a compressor. The variable orifice flow device may include, for example, an electronic expansion valve, a thermal expansion valve, or a shuttling valve controlling the flow of refrigerant into a compressor motor housing. One or more flows of refrigerant may be through a fixed orifice, a valve seat of the variable orifice flow device, or leakage through a seal of the compressor motor housing, providing a baseline refrigerant flow to the inside of the compressor motor housing in addition to the flow through the variable orifice flow device.

18 Claims, 8 Drawing Sheets

(51) Int. Cl.
<table>
<tr><td>F25B 1/10</td><td>(2006.01)</td></tr>
<tr><td>F25B 31/00</td><td>(2006.01)</td></tr>
<tr><td>F16K 37/00</td><td>(2006.01)</td></tr>
<tr><td>F04D 25/08</td><td>(2006.01)</td></tr>
<tr><td>F04B 39/06</td><td>(2006.01)</td></tr>
<tr><td>H02K 5/20</td><td>(2006.01)</td></tr>
<tr><td>F04D 29/058</td><td>(2006.01)</td></tr>
<tr><td>F25B 41/31</td><td>(2021.01)</td></tr>
</table>

(52) U.S. Cl.
CPC ......... *F04D 25/082* (2013.01); *F04D 29/058* (2013.01); *F04D 29/5806* (2013.01); *F16K 37/0025* (2013.01); *F16K 37/0033* (2013.01); *F16K 37/0041* (2013.01); *F25B 1/10* (2013.01); *F25B 31/006* (2013.01); *F25B 31/008* (2013.01); *H02K 5/20* (2013.01); *F05D 2260/205* (2013.01); *F25B 41/31* (2021.01); *Y10T 137/8242* (2015.04)

(58) Field of Classification Search
CPC ................ F04D 29/584; F04D 25/082; F05D 2260; F05D 2260/205; F05D 2260/211
See application file for complete search history.

(56) References Cited

U.S. PATENT DOCUMENTS

| | | | |
|---|---|---|---|
| 3,112,618 A | 12/1963 | Weller | |
| 4,632,358 A * | 12/1986 | Orth | B60H 1/00485 |
| | | | 251/117 |
| 4,873,838 A * | 10/1989 | Voorhis | F25B 41/062 |
| | | | 62/207 |
| 4,936,334 A | 6/1990 | Hendershot | |
| 5,016,447 A | 5/1991 | Lane et al. | |
| 5,228,308 A * | 7/1993 | Day | F25B 5/04 |
| | | | 62/198 |
| 5,924,847 A | 7/1999 | Scaringe et al. | |
| 5,980,218 A * | 11/1999 | Takahashi | F04D 29/058 |
| | | | 417/243 |
| 6,065,297 A | 5/2000 | Tischer et al. | |
| 6,093,007 A * | 7/2000 | Shaw | F04C 29/0021 |
| | | | 418/197 |
| 6,116,040 A | 9/2000 | Stark | |
| 6,244,561 B1 | 6/2001 | Hansen et al. | |
| 6,324,858 B1 | 12/2001 | Holden | |
| 7,003,971 B2 | 2/2006 | Kester et al. | |
| 7,673,452 B2 * | 3/2010 | Shimizu | F01D 25/12 |
| | | | 290/52 |
| 8,465,265 B2 | 6/2013 | Larminat | |
| 9,291,167 B2 | 3/2016 | Schreiber | |
| 9,395,111 B2 | 7/2016 | Sommer et al. | |
| 2012/0107105 A1 | 5/2012 | Korenblik | |
| 2012/0261092 A1 | 10/2012 | Heath et al. | |
| 2014/0125066 A1* | 5/2014 | Baumgart | F01D 5/085 |
| | | | 290/1 A |
| 2016/0245559 A1* | 8/2016 | Yang | F25B 31/006 |
| 2018/0038388 A1 | 2/2018 | Mizukami | |
| 2018/0073521 A1 | 3/2018 | Kobayashi et al. | |
| 2018/0195520 A1* | 7/2018 | Oh | F04D 17/122 |

OTHER PUBLICATIONS

Examination Report; European Patent Application No. 18189704.2, dated Jan. 7, 2020 (9 pages).

\* cited by examiner

REFRIGERANT GAS COOLING OF MOTOR AND MAGNETIC BEARINGS

FIELD

This disclosure relates to a compressor, particularly valves used in controlling flow of cooling gas within the compressor.

BACKGROUND

Compressor parts, particularly the motor, shaft, and bearings such as magnetic bearings require cooling while the compressor is in operation. The cooling may be provided, for example, by a flow of compressed gas discharged from the compressor. However, the flow of compressed gas may cause inefficiency due to recirculation and windage losses. The cooling demands of the compressor parts may vary with the speed of operation of the compressor and the pressure it produces at its discharge. Current systems use fixed-size holes to allow compressed gas to enter a casing of a motor of the compressor to cool compressor components.

BRIEF SUMMARY

A flow control device may be disposed between a volute housing of a compressor and a motor housing of the compressor that allows the flow of a fluid from the volute housing into the motor housing to be controlled. This may reduce recirculation and windage losses while meeting the variable cooling needs of compressor parts such as the motor, shaft and bearings.

In an embodiment, a compressor includes a volute housing receiving a discharge from a compressor, a motor housing containing at least some of a compressor motor, and a shuttling valve assembly including a first space and a second space containing a shuttling valve having at least two different cross-sectional areas at different points on the shuttling valve. The shuttling valve may include an orifice allowing the transfer of gas from the volute housing to the motor housing, with the position of the shuttling valve controlling the size of the orifice open to the motor housing. The shuttling valve may obstruct one or more openings between the volute housing and the motor housing. The extent that the shuttling valve obstructs the one or more openings may be based on the position of the shuttling valve. The position of the shuttling valve may be controlled by a spring and/or gas pressure, and the gas pressure may be controlled by one or more valves providing connections between the first space in the valve assembly and a low-pressure port or a high-pressure port. In an embodiment, the one or more valves are controlled by a controller. In an embodiment, the one or more valves is one three-way, two-position solenoid valve. In an embodiment, the one or more valves are two separate two-way valves.

Valve assembly embodiments include a shuttling valve having at least two portions with different cross-sectional areas, and first and second spaces having areas larger than the different cross-sectional areas of the shuttling valve.

In an embodiment, a method for controlling a flow of refrigerant from a volute housing to a compressor motor housing is provided. The method includes receiving a flow of refrigerant from a volute housing and directing the flow of refrigerant through one or more openings between the volute housing and the compressor motor housing, wherein the area of the one or more openings are controlled by a valve. The one or more openings may be, for example, an electronic expansion valve, a thermal expansion valve, an orifice in a shuttling valve, and/or a valve seat included in any such valves. The one or more openings may be holes, one or more of which may be obstructed by the shuttling valve. A position of a valve may be determined by a controller. The controller may adjust the position of a valve by, for example opening or closing one or more control valves to modify a pressure acting on a surface of a shuttling valve.

In an embodiment, a compressor includes a cooling line, connected to a refrigerant source, a motor housing, at least one bearing located within the motor housing, a compressor motor, located within the motor housing, and a metering device fluidly connected to the cooling line and the motor housing and configured to provide variable flow of refrigerant from the refrigerant source to the motor housing. In an embodiment, the refrigerant source is a volute housing of the compressor. In an embodiment, a shaft seal allows fluid communication between the refrigerant source and the motor housing. In an embodiment, the metering device includes a fixed orifice between the cooling line and the inside of the motor housing. In an embodiment, a fixed flow path between the cooling line and the inside of the motor housing is formed in a valve seat of the valve. In an embodiment, the metering device includes electronic expansion valve. In an embodiment, the metering device includes a thermal expansion valve.

In an embodiment, a controller receives compressor operational parameter data and determines a position for the valve. The compressor operational parameter data may include temperature data from within the motor housing and/or gas density within the motor housing.

In an embodiment, a metering device includes an inlet in fluid communication with a refrigerant source, an orifice in fluid communication with an inside of a compressor motor housing, an automated expansion valve, and a valve seat configured to receive the automated expansion valve. In this embodiment, the automated expansion valve is electrically connected to a controller that receives compressor operational parameter data and determines a position of the automated expansion valve. In an embodiment, the automated expansion valve and the valve seat control a flow of refrigerant through the orifice. In an embodiment, the metering device further includes a second orifice having a fixed size. In an embodiment, the valve seat is configured to allow a flow of refrigerant through the orifice when the automated expansion valve is in a fully extended position.

In an embodiment, a method for controlling a flow of refrigerant into a compressor motor housing is provided. The method includes providing a baseline flow of the refrigerant to the inside of the compressor motor housing, and providing a variable flow of the refrigerant to the inside of the compressor motor housing. In this embodiment, the variable flow of the refrigerant is controlled via an automated expansion valve. A method embodiment may further include combining the baseline flow and the variable flow into a cooling flow, and directing the cooling flow to travel in a direction of rotation of an internal component within the compressor motor housing. In an embodiment, the baseline flow is provided via an orifice having a fixed size. In an embodiment, the baseline flow is provided via leakage at a shaft seal of the compressor motor housing. In an embodiment, the automated expansion valve is an electronic expansion valve. In an embodiment, the automated expansion valve is a thermal expansion valve.

DETAILED DESCRIPTION

A variable flow control device disposed between a volute housing and a compressor motor housing can improve compressor efficiency by metering the amount of coolant provided based on compressor motor needs, and thus reducing recirculation and windage losses while meeting compressor cooling needs.

Figure 1:
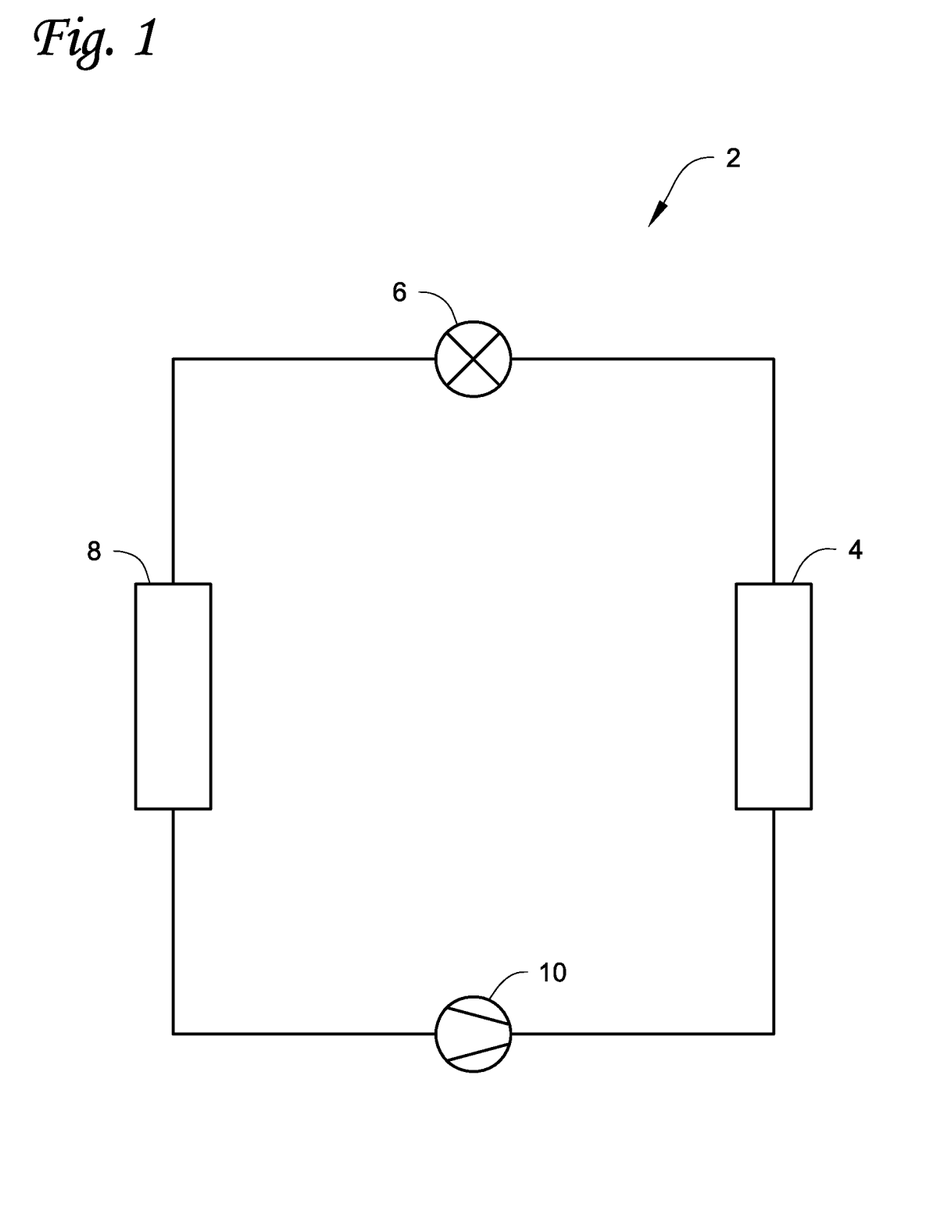
FIG. 1 shows a schematic diagram of a refrigerant circuit.

FIG. 1 is a schematic diagram of a refrigerant circuit 2, according to an embodiment. The refrigerant circuit 2 generally includes a compressor 10, a condenser 4, an expansion device 6, and an evaporator 8. The compressor 10 can be a dynamic displacement compressor, for example, a centrifugal compressor. The refrigerant circuit 2 is an example and can be modified to include additional components. For example, in an embodiment, the refrigerant circuit 2 can include other components such as, but not limited to, an economizer heat exchanger, one or more flow control devices, a receiver tank, a dryer, a suction-liquid heat exchanger, or the like.

The refrigerant circuit 2 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 10, condenser 4, expansion device 6, and evaporator 8 are fluidly connected. The refrigerant circuit 2 can operate according to generally known principles. The refrigerant circuit 2 can be configured to heat or cool a liquid process fluid (e.g., a heat transfer fluid or medium such as, but not limited to, water, glycol, or the like), in which case the refrigerant circuit 2 may be generally representative of a liquid chiller system. The refrigerant circuit 2 can alternatively be configured to heat or cool a gaseous process fluid (e.g., a heat transfer medium or fluid such as, but not limited to, air or the like), in which case the refrigerant circuit 2 may be generally representative of an air conditioner or heat pump.

In operation, the compressor 10 compresses a working fluid (e.g., a heat transfer fluid such as a refrigerant or the like) from a relatively lower pressure gas to a relatively higher-pressure gas. The relatively higher-pressure gas is also at a relatively higher temperature, which is discharged from the compressor 10 and flows through the condenser 4. The working fluid flows through the condenser 4 and rejects heat to a process fluid (e.g., air or the like), thereby cooling the working fluid. The cooled working fluid, which is now in a liquid form, flows to the expansion device 6. In an embodiment in which the condenser 4 includes a subcooler portion, the liquid working fluid can flow through the subcooler portion prior to flowing to the expansion device 6. In the subcooler portion, the working fluid may be further subcooled. The expansion device 6 reduces the pressure of the working fluid. As a result, a portion of the working fluid is converted to a gaseous form. The working fluid, which is now in a mixed liquid and gaseous form flows to the evaporator 8. The working fluid flows through the evaporator 8 and absorbs heat from a process fluid (e.g., water, glycol, air, or the like) heating the working fluid, and converting it to a gaseous form. The gaseous working fluid then returns to the compressor 10. The above-described process continues while the refrigerant circuit is operating, for example, in a cooling mode (e.g., while the compressor 10 is enabled).

Figure 2:
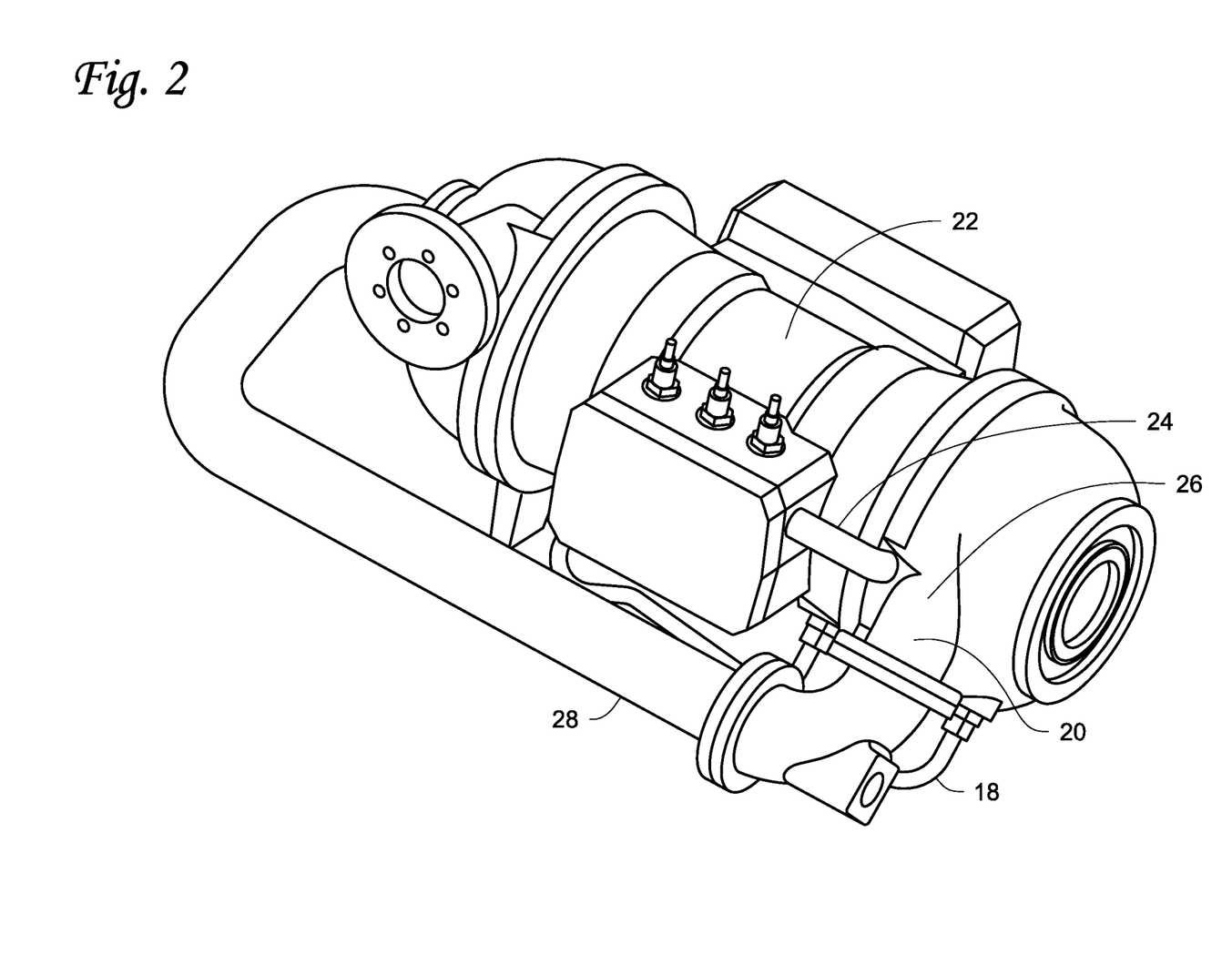
FIG. 2 shows a compressor where a valve allows a fluid to flow from a volute housing to a motor housing.

FIG. 2 shows a compressor where fluid flow between the volute housing and the motor housing is controlled by a variable flow valve. Volute housing 20 having discharge conic 26 and compressor motor housing 22 are joined by valve assembly 24 which allows fluid communication from volute housing 20 to compressor motor housing 22. Inter-stage line 28 carries fluid from the discharge conic 26 to a second stage of the compressor. Return line 18 allows fluid to flow from the inside of compressor motor housing 22 to a suction portion of volute housing 20.

Volute housing 20 receives the discharge from a compressor. The discharge of the compressor is a compressed fluid, such as a refrigerant. The volute housing may be, for example, the collecting volute of the compressor. At least a portion of the volute housing 20 may receive the discharge from a first or intermediate stage of a multi-stage compressor. The volute housing 20 may include, for example, a discharge conic 26 directing the discharge of a compressor. The discharge conic 26 may be the portion where the shuttling valve assembly 24 connects to the volute housing 20. In an embodiment, the shuttling valve assembly 24 may connect to an inter-stage line 28 downstream of the discharge conic 26 and provide gas from the inter-stage line 28 to the compressor motor housing 22. The shuttling valve assembly 24 may receive gas from any point within a multistage compressor having an intermediate gas pressure.

Compressor motor housing 22 contains compressor components, for example a compressor shaft, a bearing system, for example a magnetic bearing, and a motor driving the compressor. Compressor motor housing 22 may require refrigerant to cool those parts contained within, which may be provided from the flow of refrigerant discharged from the compressor through the volute housing 20. The parts, such as the compressor motor and shaft, may move during operations and lose efficiency due to recirculation and windage when there is excess fluid pressure, such as from refrigerant gas, within the compressor motor housing 22. Compressor motor housing 22 may vent to the suction of the compressor. The venting from compressor motor housing 22 to the suction of the compressor may be external, for example by return line 18 connecting the compressor motor housing to a suction portion of volute housing 20. The venting from compressor motor housing 22 to the discharge may also be internal, for example through openings formed in the compressor motor housing 22.

Valve assembly 24 may include, for example, the assembly shown and described in FIG. 3, FIG. 4, or FIG. 5 below. Valve assembly 24 may control the flow of refrigerant from the volute housing 20 into the compressor motor housing 22. The valve assembly 24 may provide for a first flow rate and a second flow rate between the volute housing 20 and the compressor motor housing 22, with the first flow rate and the second flow rate having different values. The valve assembly 24 may provide a flow rate which may be varied continuously between maximum and minimum values, for example based on a gas and/or spring pressure applied to a shuttling valve or a position of an automated expansion valve, such as an electronic expansion valve or a thermal expansion valve. The flow rates may be provided by controlling the size and/or number of openings or orifices through which fluid can travel from the volute housing 20 into the compressor motor housing 22. In an embodiment, valve assembly 24 may be controlled by, for example, an electronic signal, or gas pressure provided through one or more ports and one or more solenoid valves controlling a connection between the ports and a space within the valve assembly 24. The one or more solenoid valves may be controlled by, for example, a controller. In an embodiment, valve assembly 24 may be controlled by a controller sending a signal to an electronic expansion valve or a thermal expansion valve. In either of these embodiments, the controller may control the valve based on data including, for example, temperatures within the compressor motor, compressor load, compressor speed settings, stored design parameters of the compressor, or other operational data of the compressor. The controller may use pulse width modulation to provide intermediate flow rates of refrigerant into compressor motor housing 22 by varying the valve position dynamically. The data used by the controller may include functions required for pulse width modulation to achieve certain flow values.

Figure 3A:
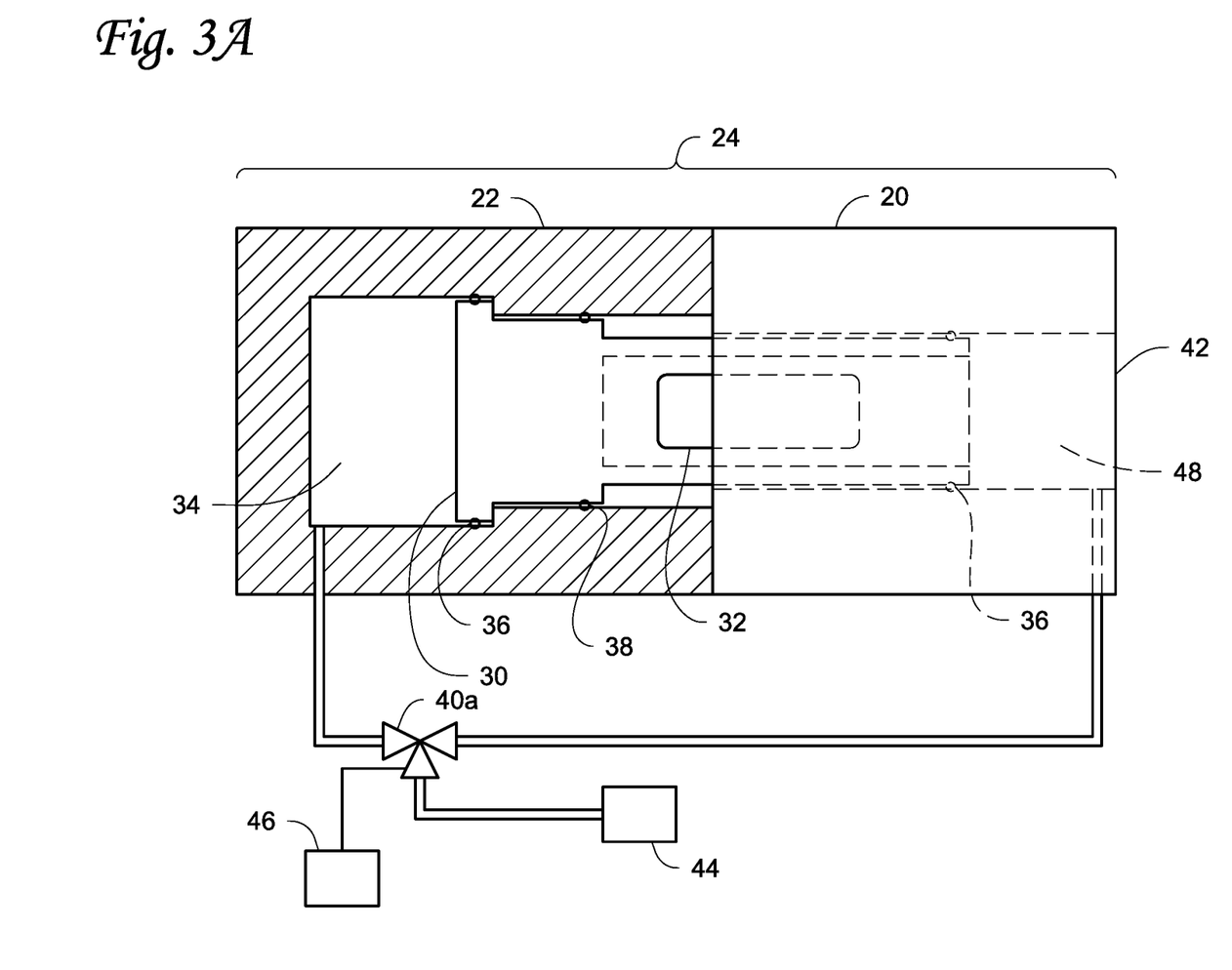
FIGS. 3A and 3B show schematic diagrams of a volute housing and a compressor motor housing, wherein a valve is installed between the volute housing and the compressor motor housing.
Figure 3B:
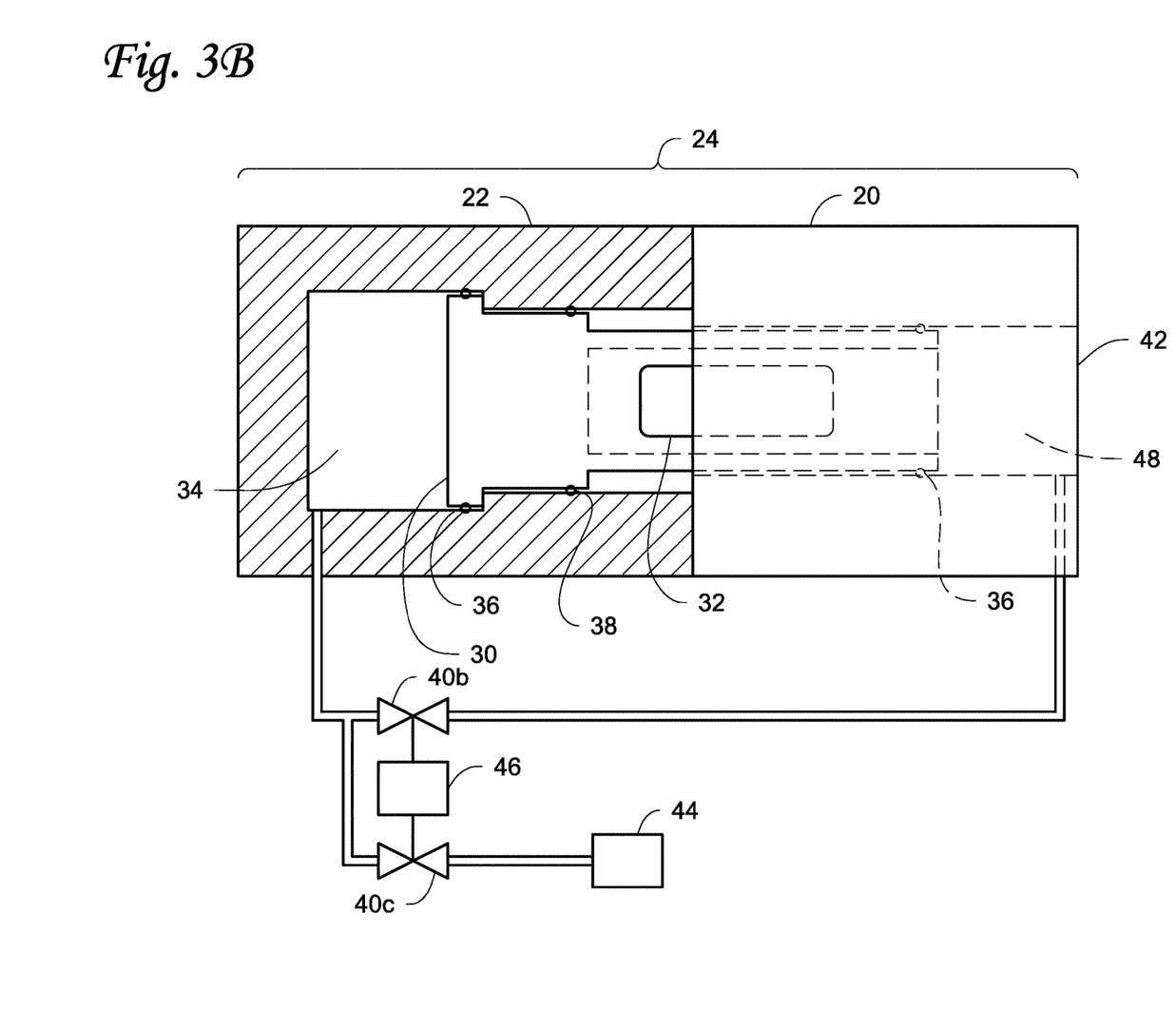

FIGS. 3A and 3B show schematic diagrams of a volute housing 20 and a compressor motor housing 22, wherein a shuttling valve 30 is installed shuttling valve assembly 24 connecting the volute housing 20 and the compressor motor housing 22. In the embodiment shown in FIGS. 3A and 3B, volute housing 20 contains the discharge flow from a compressor. The compressed fluid may travel from the volute housing 20 into the compressor motor housing 22 via an orifice 32, the size of the orifice 32 controlled by the position of shuttling valve 30. The shuttling valve 30 may include guides 36 and seal 38. The position of the shuttling valve 30 may be controlled by fluid pressures, with a first space 34 in fluid communication with at least one of a first port 44 and a second port 42, with the fluid communication determined by valve 40a or valves 40b and 40c. A second space 48 may be provided within the shuttling valve assembly to allow the shuttling valve 30 to travel between positions. The second space may be sized such that not all sections of the shuttling valve 30 may pass through it, for example by having a cross-sectional area larger than a cross-sectional area than one section of the shuttling valve 30, but a smaller cross-sectional area than that of another section of shuttling valve 30.

Volute housing 20 is a housing which, during operation of a compressor such as a centrifugal compressor, receives compressed refrigerant from the discharge of the compressor. The volute housing 20 may receive the discharge from a first or intermediate state of a multi-stage compressor. The volute housing 20 may include, for example, a discharge conic receiving the discharge of the compressor. Volute housing 20 may collect and direct the compressed refrigerant towards another stage of compression, or towards a refrigeration circuit including the compressor, such as, for example, a condenser, an expansion device, and an evaporator. Such a refrigerant circuit can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

Figure 3C:
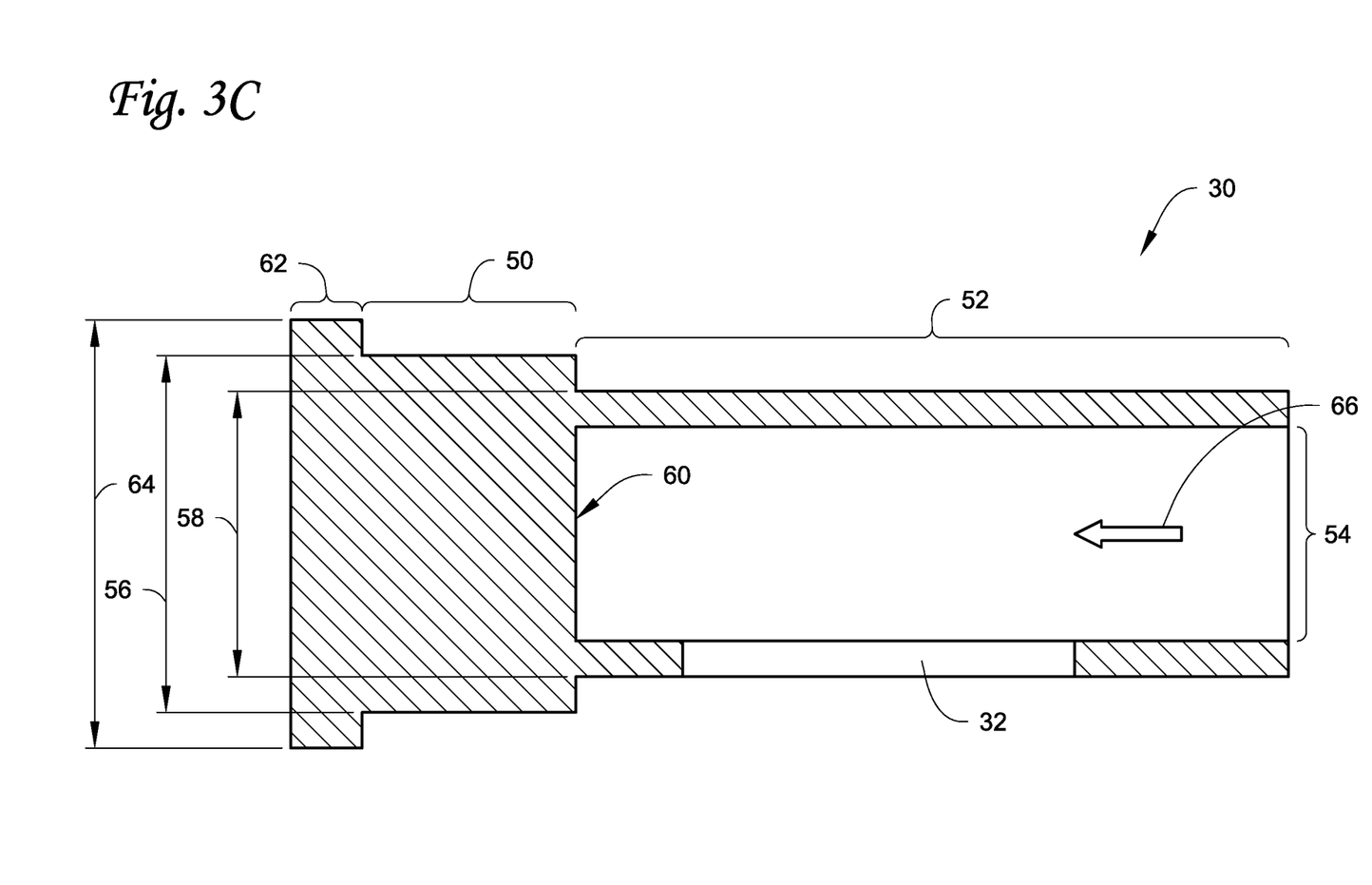
FIG. 3C shows a cut-away side view of the shuttling valve shown in FIGS. 3A and 3B.

FIG. 3C shows a detailed view of shuttling valve 30 used in FIGS. 3A and 3B. Shuttling valve 30 has at least a first section 50 having a first cross-sectional area 56 and a second section 52 having a second cross-sectional area 58. The first cross-sectional area 56 is larger than the second cross-sectional area 58. Shuttling valve 30 may include a hollow portion 54 passing through the shuttling valve 30 to provide an orifice 32 allowing fluid flow through a portion of the shuttling valve 30. The shuttling valve 30 may be movable within a shuttling valve assembly 24, with the movement partially constrained by the cross-sectional areas available within the shuttling valve assembly 24. Second space 48 in shuttling valve assembly 24 may have a cross-sectional area larger than second cross-sectional area 58, but smaller than first cross-sectional area 56. As a result, first section 50 cannot enter second space 48, but second section 52 can move within second space 48. In an embodiment, there may be a third section 62 of shuttling valve 30 having a third cross-sectional area 64, where the third cross-sectional area 64 is larger than the first cross-sectional area. Refrigerant flow 66 from volute housing 20 may enter the hollow portion 54 of the shuttling valve 30. Within the hollow portion 54, refrigerant flow 66 may exert pressure on surface 60. The pressure exerted on surface 60 is countered by spring and/or gas pressure acting on third section 62 of the shuttling valve 30, with the balance of forces positioning the shuttling valve 30 within the shuttling valve assembly 24. The refrigerant flow may exit the shuttling valve 30 and enter compressor motor housing 22 via orifice 32, which may be partially obstructed by the shuttling valve assembly 24 based on the position of the shuttling valve 30.

Returning to FIGS. 3A and 3B, the shuttling valve 30 may be aligned within the shuttling valve assembly 24 by one or more guides 36. The guides may be, for example, polymer rings such as, for example, impregnated Teflon, Nylon, Delrin or similar materials. The guides may be disposed on the outer surface of the shuttling valve 30 and extend from the outer surface of the shuttling valve 30 to the surface defining the inner space within shuttling valve assembly 24. The guides maintain alignment between the shuttling valve 30 and the space within the shuttling valve assembly 24 to minimize contact and friction of the shuttling valve as it moves within the inner space of the shuttling valve assembly. The guides 36 may be circumferential linear guides surrounding the circumference of the shuttling valve 30 and aligning the shuttling valve 30 such that it travels in a linear fashion along an axis within the shuttling valve assembly 24.

Seal 38 restricts flow within the inner space of the shuttling valve assembly. The seal may be an oiled seal or a dynamic oil-free seal. Whether the seal is oiled or oil-free may be based on the compressor in which the valve is used. The seal 38 may be made of standard sealing materials. The seal 38 provides a pressure separation between second space 48 and first space 34. The pressure separation between spaces 34 and 48 may be used to provide a force acting on shuttling valve 30 so as to control its position. In the embodiment shown in FIGS. 3A and 3B, the seal 38 is disposed on the shuttling valve 30 between the orifice 32 and the first space 34.

Shuttling valve 30 may be positioned by fluid pressures and/or springs. A spring (not shown) may be placed within the first space 34 within the shuttling valve assembly 24, such that it applies a force to shuttling valve 30. A spring may also be located within second space 48. The placement and stiffness of springs may be based on the pressure differential between the low pressure provided by port 44 and the high pressure provided by port 42. In the embodiment shown in FIG. 3, force may be applied to the shuttling valve 30 via fluid pressure. First space 34 may be connected to at least one of a first port 44 or a second port 42 via one or more lines, internal passages, or tubes which allow fluid communication between that port and first space 34. First port 44 may provide a fluid at a first pressure, less than the pressure of fluid from the second port 42. For example, first port 44 may be connected to the suction port of the compressor. Second port 42 provides a fluid at a higher pressure than that of first port 44, for example by connection to the discharge from the compressor, for example via a line connecting to the volute housing 20. In the embodiment shown in FIG. 3A, valve 24 allows switching between having first space 34 in fluid communication with first port 44, and having first space 34 in fluid communication in with second port 42. Valve 40a is a 3-port, 2-way solenoid valve. Valve 40a may be controlled by, for example, a controller 46 connected to the valve and directing the port to which the first space 34 is in fluid communication. The control may be based, for example, on a temperature reading from a temperature sensor within the compressor motor housing 22, a current speed at which the compressor is being operated, or other operational parameters of the compressor. In the embodiment shown in FIG. 3B, the line connecting the first space 34 with the first port 44 and the line connecting the first space with the second port 42 are each controlled by a separate two-way valve 40b and 40c. In an embodiment where there are multiple separate two-way valves 40b and 40c, fluid communication between the first space 34 and the first and second ports 44 and 42 may be controlled by, for example, opening one valve while closing the other and vice versa. The valves may be controlled by a controller 46 connected to each of the valves 40b and 40c.

As shown in FIGS. 3A and 3B, when the valve 40a or valves 40b and 40c are in a position where the first space 34 is in fluid communication with the higher-pressure second port 42, the pressure within the first space 34 is higher, pushing on the shuttling valve 30. This force counters the force received from the pressure within the volute housing 20 and acting on surface 60 within the shuttling valve 30. The balance of forces positions the shuttling valve 30 such that only a portion of the orifice allows fluid flow from the volute housing into the motor housing. When the valve 40a or valve 40b and 40c are in a position where it the first space 34 is in fluid communication with the lower-pressure first port 44, the pressure within the first space 34 on shuttling valve 30 is less than the force applied by the pressure within the volute housing 20. This may result in the shuttling valve being in a position where a larger portion of the orifice 32 allows fluid flow from the volute housing 20 into a flow channel 32 the compressor housing 22. The flow channel may be, for example, an annular flow surrounding a portion of the shuttling valve 30 extending into the compressor housing 22. The force provided by fluid pressure within the first space 34 may be supplemented by, for example, a spring.

In the embodiment shown in FIG. 3C, orifice 32 extends through shuttling valve 30, forming a hollow portion 54 within the shuttling valve 30 that allows refrigerant flow 66 to travel from the volute housing 20 into the compressor motor housing 22. The orifice 32 includes a first end which is exposed within the volute housing 20 and capable of receiving refrigerant from flow through the volute housing 20. Orifice 32 includes one or more openings to the compressor motor housing 22, allowing the fluid that has entered the orifice 32 to enter the compressor motor housing 22. The one or more openings may be partially exposed to the compressor motor housing 22 in a first position of the shuttling valve 30, providing a first area through which refrigerant can flow into the housing. In a second position of the shuttling valve 30, more or all of the one or more openings may be exposed to the compressor motor housing 22, providing a second area, larger than the first, through which refrigerant can flow into the compressor motor housing 22. In an embodiment where the orifice 32 has more than one opening, the openings may be a series of holes feeding an annulus. Shuttling valve 30 and the clearances surrounding it within the valve assembly may be controlled to reduce leakage from portions of orifice 32 that are not exposed to the compressor motor housing 22.

Figure 4A:
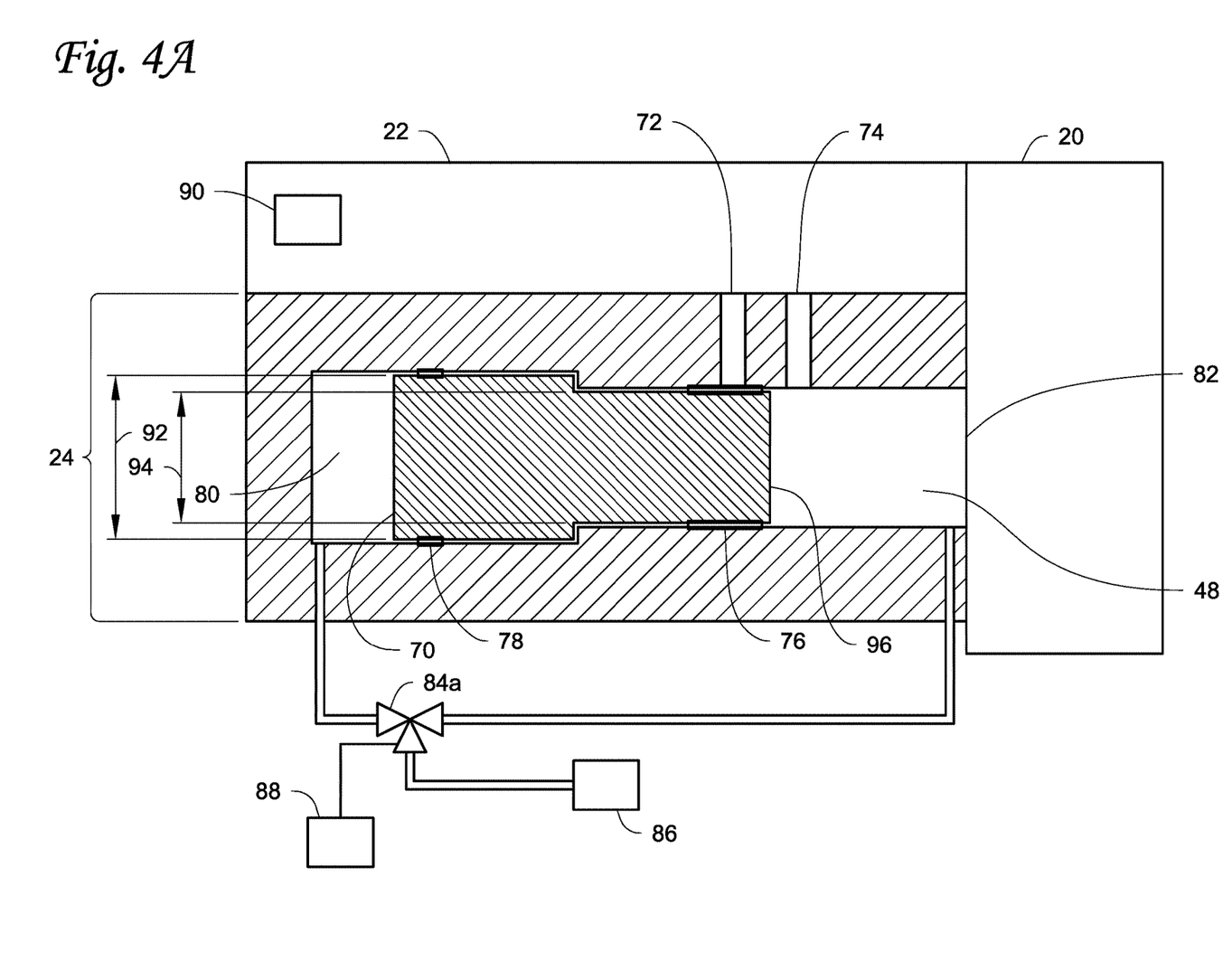
FIGS. 4A and 4B show schematic diagrams for an alternative valve between a volute housing and a compressor motor housing.
Figure 4B:
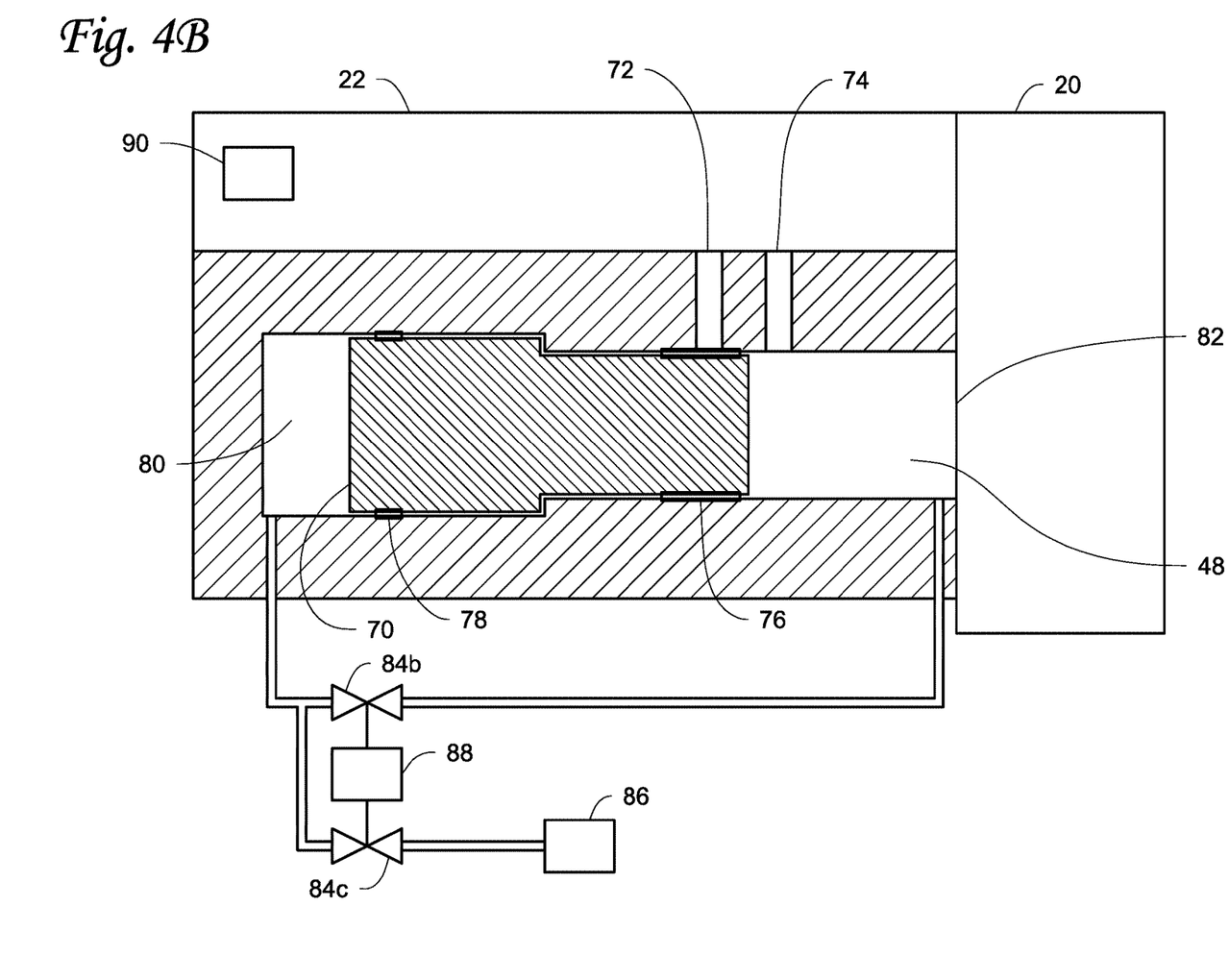

FIGS. 4A and 4B shows a schematic diagram for another embodiment controlling flow between a volute housing 20 and a compressor motor housing 22. In the embodiment shown in FIG. 4, volute housing 20 has first opening 72 and second opening 74 providing fluid communication between the volute housing 20 and the compressor motor housing 22. The first opening 72 may be blocked by shuttling valve 70 when it is in a first position. In the embodiment shown in FIGS. 4A and 4B, a first axial seal and guide 78 is located at one end of shuttling valve 70 and a second axial seal and guide 76 is located at the other end of shuttling valve 70. A first space 80 is in fluid communication with at least one of a first port 86 or a second port 82, via valve 84a or valves 84b and 84c.

Volute housing 20 receives the discharge from a compressor. The discharge of the compressor is high-pressure fluid, such as a refrigerant. The volute housing 20 may receive the discharge from a first or intermediate state of a multi-stage compressor. The volute housing 20 may include, for example, a discharge conic receiving a discharge of a compressor. The compressor housing 22 contains compressor components, for example a compressor shaft, a magnetic bearing, and a motor driving the compressor. Compressor housing 22 may require refrigerant to cool those parts contained within, which may be provided from the flow of refrigerant discharged from the compressor through the volute housing 20. At least some of the compressor parts within compressor motor housing 22 move during operations, such as the shaft and the compressor motor, and may be reduced in efficiency by recirculation or windage losses from any excess pressure, such as from refrigerant gas, within compressor housing 22.

Fluid communication between volute housing 20 and motor housing 22 may be provided by first opening 72 and second opening 74. These openings may be holes. At least the first opening 72 may be blocked by the shuttling valve 70 when the shuttling valve 70 is in a first position. First opening 72 may be exposed by movement of the shuttling valve 70 from a first position to a second position. In an embodiment, there may be a single opening which is partially obstructed by the shuttling valve 70 in a first position, and which is less obstructed when the shuttling valve 70 is in a second position. In an embodiment, there may be multiple openings which may be obstructed or exposed based on the position of shuttling valve 70. The first and second openings 72 and 74 may allow compressed refrigerant from within the volute housing 20 to enter the compressor motor housing 22. The first and second openings 72 and 74 may have different sizes. The sizes of first and second openings 72 and 74 may be based on required flow rates and the pressure differential between the volute housing 20 and the compressor motor housing 22.

Shuttling valve 70 has at least two different cross-sectional areas 92 and 94. Shuttling valve 70 may be enclosed within shuttling valve assembly 24, with the movement of shuttling valve 70 constrained by the differences in cross-sectional area among parts of the shuttling valve 70 and the cross-sectional area of spaces 48 and 80 within shuttling valve assembly 24. Shuttling valve 70 may receive pressure from the volute housing 20 on a first side 96 of the shuttling valve 70. Shuttling valve 70 may receive pressure from fluid and/or a spring located in first space 80 on another side, different from the first side receiving pressure from the volute housing 20. Shuttling valve 70 may be solid or hollow.

First axial seal and guide 78 is located where the shuttling valve is at its larger cross-sectional area. First axial seal and guide 78 may be used to reduce leakage of fluid out of the first space 80. Second axial seal and guide 76 may be located at an opposite end of the shuttling valve 70 from the first axial seal and guide. Second axial seal and guide 76 may reduce the leakage of fluid from the volute housing. In an embodiment, the second axial seal and guide 76 blocks the first opening 72 when the shuttling valve 70 is at a first position within the shuttling valve assembly 62. Each axial seal and guide 78 and 76 may also position the shuttling valve 70 to maintain alignment of the shuttling valve 70 within the shuttling valve assembly 62. First and second axial seals and guides 54 and 56 may be oiled or dynamic oil-free seals. First and second axial seals and guides 54 and 56 may include circumferential linear guides surrounding the circumference of the shuttling valve 70 and aligning the shuttling valve 70 such that it travels in a linear fashion along an axis within the shuttling valve assembly 24. Standard seals, guides, or combinations thereof may be used for the first and second axial seals and guides 54 and 56, and 78 and 76.

Shuttling valve 70 may be positioned by fluid pressures and/or a spring. A spring (not shown) may be placed within the first space 80 or second space 48, such that it applies a force to shuttling valve 70. In the embodiment shown in FIGS. 4A and 4B, force may be applied to the shuttling valve 70 via fluid pressure. First space 80 may be connected to at least one of a first port 86 or a second port 82 via one or more lines or tubes which allow fluid communication between that port and first space 80. First port 86 may provide a fluid at a first pressure, less than the pressure of fluid from the second port 82. For example, first port 86 may be connected to the suction port of the compressor. Second port 82 provides a fluid at a higher pressure than that of first port 86, for example by connection to the discharge from the compressor, for example via a line connecting to the volute housing 20. In the embodiment shown in FIG. 4A, three-way valve 84a allows switching between having first space 80 in fluid communication with first port 86, and having first space 80 in fluid communication in with second port 82. Valve 84a may be, for example, a 3-port, 2-way solenoid valve. Valve 84a may be controlled by, for example, a controller 88 connected to the valve and directing the port to which the first space 80 is in fluid communication. The control may be based, for example, on a temperature reading from a temperature sensor 90 within the compressor motor housing 22, a current speed at which the compressor is being operated, or other operational parameters. In an embodiment, the line connecting the first space 80 with the first port 86 and the line connecting the first space with the second port 82 may each be controlled by a separate two-way valve 84b and 84c.

In an embodiment where there are multiple separate two-way valves 84b and 84c, fluid communication between the first space 80 and the first and second ports 56 and 58 may be controlled by, for example, opening one of valves 84b or 84c while closing the other and vice versa.

As shown in FIG. 4, when the valve 84a or valve 84b and 84c are in a position where the first space 80 is in fluid communication with the higher-pressure second port 82, the pressure within the first space 80 is higher, pushing on the shuttling valve 70. This force counters the force received from the pressure within the volute housing 20. The balance of forces positions the shuttling valve 70 such that the shuttling valve 70 blocks first opening 72. This may restrict the flow of fluid from the volute housing 20 into compressor motor housing 22. When the valve 84a or valves 84b and 84c are in a position where it the first space 80 is in fluid communication with the lower-pressure first port 86, the pressure within the first space 80 on shuttling valve 70 is less than the force applied by the pressure within the volute housing 20. This may result in the shuttling valve being in a position where first opening 72 is exposed, allowing fluid flow from the volute housing 20 into the compressor housing 22. The force provided by fluid pressure within the first space 80 may be supplemented by, for example, a spring acting on the shuttling valve 70.

During operations, the pressure provided by the volute housing 20 and acting on shuttling valve 70 may be determined by the speed at which the compressor is being operated. During operations, the pressure provided to the first space 80 may be controlled based on the cooling needs of the compressor motor elements within compressor motor housing 22. During ordinary operations, the first space 80 may be kept in fluid communication with the higher-pressure second port 88 via valve 84a or valves 84b and 84c. While the first space 80 is in fluid communication with higher-pressure second port 88, the pressure within first space 80 maintains the position of the shuttling valve 70 such that opening 72 is obstructed, but opening 74 allows some flow of refrigerant into compressor motor housing 22. The compressor may need additional cooling when a temperature within the compressor motor housing 22, for example measured by temperature sensor 90, exceeds a threshold. When the threshold is exceeded by the temperature measured by temperature sensor 90, the first space 80 may be put in fluid communication with the higher-pressure second port 88 lower-pressure first port 86 via valve 84a or valves 84b and 84c. This reduces the pressure in first space 80, and the shuttling valve 70 is moved further into the first space by the pressure exerted from the fluid within the volute housing 20. The movement of shuttling valve 70 exposes opening 72, as well as opening 74, allowing a larger flow of fluid to travel from the volute housing 20 to the compressor motor housing 22. The valve position may be, for example, based on motor input power and motor temperature. Motor input power may be used as a feed forward control, for example by moving from a low-flow valve position to a high-flow valve position when motor input power exceeds a predefined value, or vice versa when the input power drops below the predefined value. Motor temperature may be a feedback control, for example moving from a low-flow valve position to a high-flow valve position when a temperature measured within the compressor motor housing 22 exceeds a predefined value and vice versa when the measured temperature drops below the predefined value. Control may be based on particular ranges of temperatures or input power or multiple predefined values, with each range or predefined value associated with particular valve positions or valve position operations such as pulse width modulation control of valve position.

Figure 5:
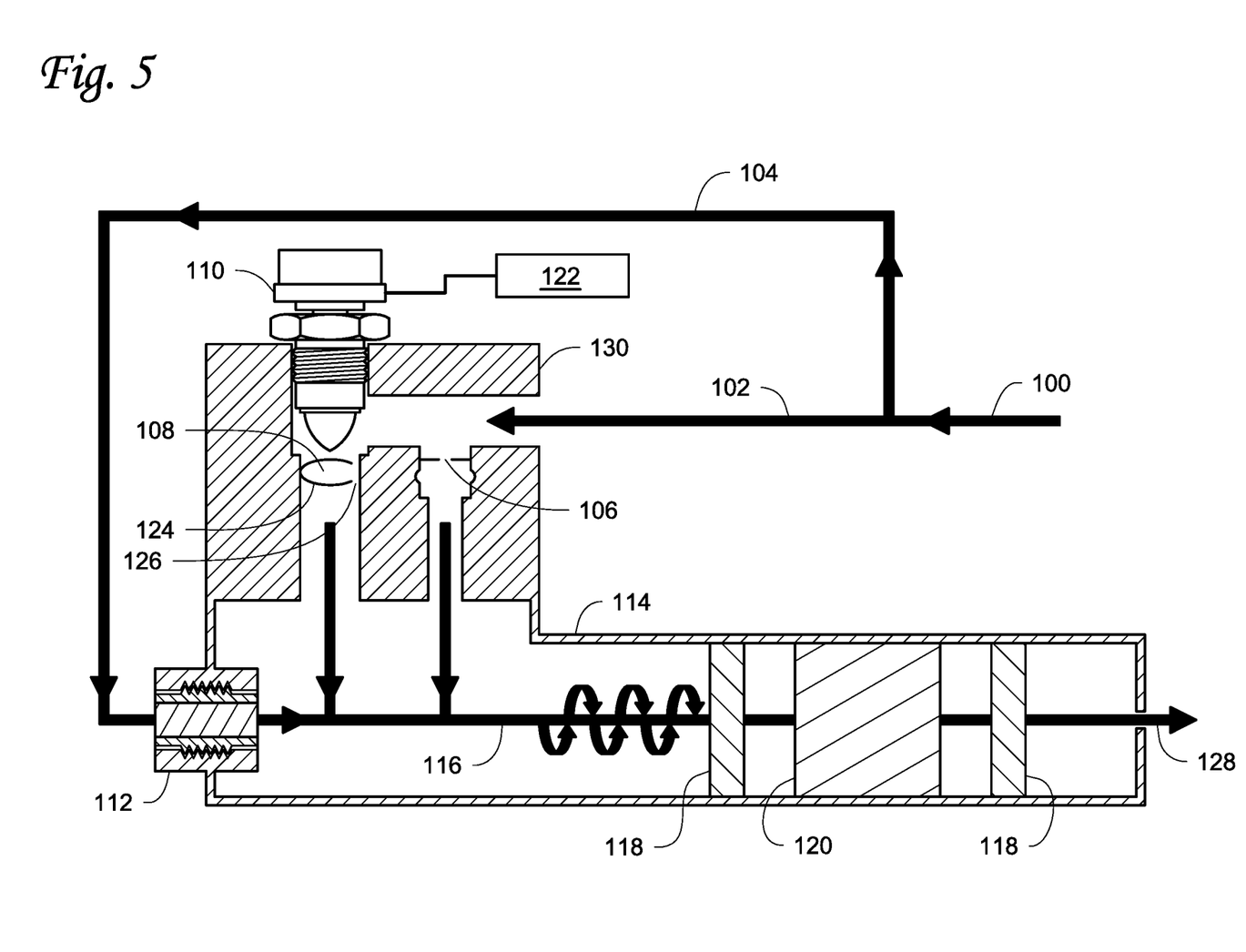
FIG. 5 shows a schematic diagram of an embodiment for controlling flow of refrigerant into a compressor motor housing.

FIG. 5 shows a schematic diagram of an embodiment for controlling flow of refrigerant into a compressor motor housing 114, and wherein additional refrigerant enters the compressor motor housing 114 at a shaft seal 112.

Refrigerant flow 100 splits into refrigerant flow 102, directed to a metering device 130 controlling flow into the compressor motor housing 114, and refrigerant flow 104. Refrigerant flow 100 may be, for example, the inter-stage flow of a multi-stage compressor or the discharge from a compressor and/or a leakage a shaft seal in a first stage of compression (similar to shaft seal 112).

Flow 100 is a flow of refrigerant from a compressor. Flow 100 may be from a first stage of a multi-stage compressor, such as from a volute housing 20 or a discharge conic 26 of the embodiment shown in FIG. 2. Flow 100 may optionally include refrigerant flow from an economizer of the compressor. Flow 100 may include leakage from a shaft seal similar to shaft seal 112.

Flow 102 enters the metering device 130. In an embodiment, a portion of flow 102 passes through a first orifice 106 and into a space within the compressor motor housing 114. Another portion of flow 102 enters compressor motor housing via orifice 108, controlled by automated expansion valve 110. Automated expansion valve 110 is controlled by controller 122. In an embodiment, a portion of flow 102 enters compressor motor housing 114 through the geometry of valve seat 124, such as a gap 126, even when automated expansion valve 110 is in a position maximizing obstruction of refrigerant flow through second orifice 108. Flow 102 may be directed to the metering device 130 via a cooling line, such as that shown for valve assembly 24 in FIG. 2.

Flow 102 is a portion of flow 100 that has been directed towards a metering device 130. Metering device 130 may be, for example, the valve assembly 24 in the embodiment shown in FIG. 2. The metering device 130 controls flow into the compressor motor housing 114. In the embodiment shown in FIG. 5, the metering device 130 includes a first orifice 106 and a second orifice 108, and an automated expansion valve 110 controlling the flow through the second orifice 108. However, in an embodiment, the orifice 106 may not be present or the orifice 108 and the automated expansion valve 110 may not be present.

First orifice 106 can allow a baseline flow of refrigerant to enter the compressor motor housing 114. The baseline flow of refrigerant is provided to compressor motor housing 114 under all operating conditions. The baseline flow of refrigerant is a flow of refrigerant into the compressor motor housing 114 that is not actively controlled. The baseline flow of refrigerant may be a flow having a fixed restriction. The amount of the baseline flow through the fixed restriction may depend on compressor operating conditions such as pressures throughout the system. The baseline flow of refrigerant may be determined by the design of first orifice 106, valve seat 124, and/or shaft seal 112. The baseline flow of refrigerant may be a predetermined amount of refrigerant, defined by, for example a flow rate, a pressure within the compressor motor housing 114, a pressure difference between the compressor motor housing and a discharge gas such as the first or second stage or high pressure discharges of the compressor, or a gas density within the compressor motor housing 114, or combinations thereof. First orifice 106 is fixed in size. First orifice 106 may be excluded from some embodiments, for example embodiments where the baseline flow of refrigerant into compressor motor housing 114 is provided through leakage at a shaft seal 112 and/or via the geometry of a valve seat 124. In an embodiment, the baseline flow of refrigerant is provided via first orifice 106. In an embodiment, the baseline flow of refrigerant is flow through first orifice 106 and leakage at shaft seal 112. In an embodiment, the baseline flow of refrigerant is flow through first orifice 106 and flow through valve seat 124 provided by the size or geometry of valve seat 124.

Second orifice 108 is an orifice allowing a flow of refrigerant to enter compressor motor housing 114. Second orifice 108 may allow a baseline flow of refrigerant to enter compressor motor housing 114, for example via the geometry of valve seat 124, such as shapes or sizes allowing some gas to pass through second orifice 108 even when automated expansion valve 110 is in a fully extended position and at least partially obstructing flow through second orifice 108.

Automated expansion valve 110 is a controllable valve which may be extended into valve seat 124 to limit or block the flow of refrigerant through second orifice 108 into compressor motor housing 114. Automated expansion valve 110 may be, for example, an electronic expansion valve (EXV) or a thermal expansion valve (TXV). In an embodiment, automated expansion valve 110 is a controllable precision flow control valve, for example a needle valve, proportioning valve, or pressure regulating valve. In an embodiment, automated expansion valve 110 may be replaced by a simple solenoid valve, providing a controllable binary (e.g. off/on) flow. In an embodiment using a solenoid valve, the open/closed status of the solenoid may be varied over time to vary the flow rate over time, for example by pulse width modulation. Automated expansion valve 110 may be controlled to provide a variable flow through second orifice 108. The position of automated expansion valve 110 may be controlled by controller 122.

Controller 122 may govern the operation of automated expansion valve 110 based on compressor and/or chiller operational data. Compressor operational data used by the controller may include temperature data, compressor load data, gas density within compressor motor housing 114, or other operational parameters relating to component cooling requirements and cooling those components through refrigerant flow into the compressor motor housing 114. Temperature data may be, for example temperature within the compressor motor housing 114 or at particular components within the compressor motor housing 114 such as bearings 118 or motor 120. Compressor load data may include, for example, the operating speed of the compressor and/or the suction pressure of the compressor, the temperature and/or pressure of high pressure gas, the gas temperature and/or pressure within the compressor motor housing 114, bearing temperature and/or motor temperature. Controller 122 may use a predictive model, for example calculating expected steady state component temperatures based on changes to operating conditions. In an embodiment, controller 122 governs the operation of automated expansion valve 110 to pre-emptively adjust a cooling flow based on one or more predicted component temperatures determined using a predictive model.

Valve seat 124 receives a portion of automated expansion valve 110 to control the flow through second orifice 108. In an embodiment, valve seat 124 may be configured such that when expansion valve 110 is fully extended, automated expansion valve 110 and valve seat 124 completely obstruct the flow of refrigerant into second orifice 108. In an embodiment, valve seat 124 may be configured to allow a baseline flow of refrigerant into the compressor motor housing 114, for example based on the size or shape of valve seat 124 or an opening or channel formed in the valve seat 124. In the embodiment shown in FIG. 5, valve seat is configured to allow a baseline flow of refrigerant into compressor motor housing 114 through valve seat opening 126. Valve seat opening 126 is a gap in the valve seat allowing refrigerant to flow past automated expansion valve 110 even when automated expansion valve 110 is fully extended. In an embodiment, the baseline flow of refrigerant is flow through valve seat 124. Valve seat opening 126 can be excluded from some embodiments, for example embodiments where the baseline flow of refrigerant is provided by leakage at shaft seal 112 and/or flow through a first orifice 106. In an embodiment, the baseline flow of refrigerant is flow through the valve seat 124 and flow through first orifice 106. In an embodiment, the baseline flow of refrigerant is flow through valve seat 124 and leakage at shaft seal 112.

A portion of flow 104 may enter compressor motor housing 114 via leakage at shaft seal 112. Shaft seal 112 is where a shaft driven by motor 120 exits the compressor motor housing 114. Flow 104 may be directed to or past shaft seal 112, resulting in some of flow 104 leaking through shaft seal 112 into compressor motor housing 114. The leakage through shaft seal 112 may provide some or all of the baseline flow of refrigerant to the interior of compressor motor housing 114. In an embodiment, the baseline flow of refrigerant is leakage through shaft seal 112. In an embodiment, the baseline flow of refrigerant is leakage through shaft seal 112 and a flow through first orifice 106. In an embodiment, the baseline flow of refrigerant is leakage through shaft seal 112 and flow through valve seat 124 provided by the size or geometry of valve seat 124. In an embodiment, the baseline flow of refrigerant is leakage at shaft seal 112, flow through first orifice 106, and flow through valve seat 124.

The refrigerant flows into compressor motor housing 114 combine into cooling refrigerant flow 116. Cooling refrigerant flow 116 may be directed to have a velocity in the same direction as rotation of internal components within the compressor motor housing 114 to reduce recirculation and windage. Bearings 118 and compressor motor 120 are cooled by the cooling refrigerant flow 116. Gas from cooling bearings 118 and compressor motor 120 may be returned to the compressor via flow 128 to be compressed again, for example by introduction into the first stage of compression of a multi-stage compressor. For example, flow 128 may be introduced into a multi-stage compressor between inlet guide vanes and a first stage impeller inlet of the multi-stage compressor.

Aspects:

It is appreciated that any of aspects 1-15 may be combined with any of aspects 16-20. Any of aspects 21-34 may be combined with any of aspects 35-37 and/or aspects 38-43, and any of aspects 35-37 may be combined with any of aspects 38-43.

Aspect 1. A compressor, comprising:

a volute housing that receives a discharge of the compressor, a motor housing enclosing one or more components of a motor of the compressor, and a shuttling valve assembly allowing a fluid to pass from the volute housing receiving the discharge into a space within the motor housing, wherein the shuttling valve assembly includes:

a shuttling valve having at least a first valve cross-sectional area and a second valve cross sectional area, wherein the first cross-sectional area is larger than the second cross-sectional area a first space having a first space cross-sectional area larger than the first valve cross-sectional area, a second space having a second space cross-sectional area larger than the second valve cross-sectional area and smaller than the first valve cross-sectional area, and a seal, disposed on the shuttling valve.

Aspect 2. The compressor according to aspect 1, wherein the shuttling valve comprises an opening through which the fluid can flow, and that a portion of the opening through which the fluid can flow that is exposed to within the motor housing varied based on a position of the shuttling valve.

Aspect 3. The compressor according to any of aspects 1-2, wherein at least two holes provide fluid communication between the volute housing and the motor housing, and wherein the shuttling valve obstructs at least one of the holes when in a first position, and obstructs fewer of the plurality of holes in a second position.

Aspect 4. The compressor according to any of aspects 1-3, wherein a spring is located in the first space.

Aspect 5. The compressor according to any of aspects 1-4, further comprising a fluid line connected the first space, a low pressure port, and a high pressure port.

Aspect 6. The compressor according to aspect 5, wherein the fluid line includes a three-way solenoid valve.

Aspect 7. The compressor according to aspect 6, further comprising a controller connected to the three-way solenoid valve and directing the position of the three-way solenoid valve.

Aspect 8. The compressor according to aspect 5, wherein the fluid line includes a first two-way valve between the first space and the low pressure port, and a second two-way valve between the first space and the high pressure port.

Aspect 9. The compressor according to aspect 8, further comprising a controller connected to the first two-way valve and the second two-way valve, the controller directing the positions of the first two-way valve and the second two-way valve.

Aspect 10. The compressor according to any of aspects 1-9, wherein the seal is a dynamic oil-free seal.

Aspect 11. The compressor according to aspect 10, wherein the dynamic oil-free seal is located on a portion of the shuttling valve having the first valve cross-sectional area.

Aspect 12. The compressor according to any of aspects 1-11, further comprising a circumferential linear guide aligning the shuttling valve within the shuttling valve assembly.

Aspect 13. The compressor according to any of aspects 1-12, wherein the seal includes a guide aligning the shuttling valve within the shuttling valve assembly.

Aspect 14. The compressor according to aspect 13, wherein the seal is located on a portion of the shuttling valve having the second valve cross-sectional area.

Aspect 15. The compressor according to any of aspects 1-14, wherein a rate of flow of the fluid is based on the position of the shuttle valve.

Aspect 16. A valve assembly for use in a compressor, comprising:

a shuttling valve having at least a first valve cross-sectional area and a second valve cross sectional area, wherein the first cross-sectional area is larger than the second cross-sectional area, a first space having a first space cross-sectional area larger than the first valve cross-sectional area, a second space having a second space cross-sectional area larger than the second valve cross-sectional area and smaller than the first valve cross-sectional area, and at least one orifice putting a portion of a volute housing receiving a compressed fluid in fluid communication with an inner volume of a compressor motor housing.

Aspect 17. The valve assembly of according to aspect 16, wherein the at least one orifice comprises an opening in the shuttling valve through which the fluid can flow, and wherein a size of a portion of the opening through which the fluid can flow that is exposed to the inner volume of a compressor motor housing varies based on a position of the shuttling valve.

Aspect 18. The valve assembly according to any of aspects 16-17, wherein the at least one orifice comprises at least two holes in the valve assembly, and wherein the shuttling valve obstructs at least one of the holes when in a first position, and obstructs fewer of the plurality of holes in a second position.

Aspect 19. The valve assembly according to any of aspects 16-18, further comprising a fluid line connected the first space, a low pressure port, and a high pressure port.

Aspect 20. The valve assembly according to aspect 19, wherein the fluid line includes a three-way solenoid valve.

Aspect 21. A compressor, comprising:
a cooling line fluidly connected to a refrigerant source,
a motor housing,
at least one bearing located within the motor housing,
a compressor motor located within the motor housing, and
a metering device fluidly connected to the cooling line and the motor housing and configured to provide variable flow of refrigerant from the refrigerant source to the motor housing.

Aspect 22. The compressor according to aspect 21, wherein the refrigerant source is a volute housing of the compressor.

Aspect 23. The compressor according to any of aspects 21-22, further comprising a shaft seal, wherein the motor housing is in fluid communication with the refrigerant source via the shaft seal.

Aspect 24. The compressor according to any of aspects 21-23, wherein the metering device further comprises a fixed orifice between the cooling line and an inside of the motor housing.

Aspect 25. The compressor according to any of aspects 21-24, wherein the metering device further comprises a valve and a fixed flow path formed in a valve seat of the valve.

Aspect 26. The compressor according to any of aspects 21-25, wherein the metering device comprises an electronic expansion valve.

Aspect 27. The compressor according to any of aspects 21-25, wherein the metering device comprises a thermal expansion valve.

Aspect 28. The compressor according to any of aspects 21-25, wherein the metering device comprises a solenoid valve.

Aspect 29. The compressor according to aspect 28, wherein the solenoid valve is controlled according to pulse width modulation.

Aspect 30. The compressor according to any of aspects 21-29, wherein the compressor is a multi-stage compressor and the refrigerant source comprises interstage flow and seal leakage.

Aspect 31. The compressor according to any of aspects 21-30, further comprising a controller, wherein the controller receives compressor operational parameter data and determines a position of the valve.

Aspect 32. The compressor according to aspect 31, wherein the compressor operational parameter data comprises a gas density within the motor housing.

Aspect 33. The compressor according to any of aspects 31-32, wherein the compressor operational parameter comprises temperature data from within the motor housing.

Aspect 34. The compressor according to any of aspects 21-30, further comprising a controller, wherein the controller receives chiller operational parameter data and determines a position of the valve.

Aspect 35. A metering device comprising:
an inlet in fluid communication with a refrigerant source,
an orifice in fluid communication with an inside of a compressor motor housing,
an automated expansion valve,
a valve seat configured to receive the automated expansion valve, wherein the automated expansion valve and the valve seat control a flow of refrigerant through the orifice
wherein the automated expansion valve is electrically connected to a controller to receive position information for the automated expansion valve, wherein the controller receives compressor operational parameter data, and determines a position of the automated expansion valve.

Aspect 36. The metering device according to aspect 35, further comprising a second orifice having a fixed size.

Aspect 37. The metering device according to any of aspects 35-36, wherein the valve seat is configured to allow a flow of refrigerant through the orifice when the automated expansion valve is in a fully extended position.

Aspect 38. A method of providing refrigerant to an inside of a compressor motor housing, comprising:
providing a baseline flow of the refrigerant to the inside of the compressor motor housing, and
providing a variable flow of the refrigerant to the inside of the compressor motor housing, wherein the variable flow of the refrigerant is controlled via an automated expansion valve.

Aspect 39. The method according to aspect 35, further comprising:
combining the baseline flow and the variable flow into a cooling flow, and
directing the cooling flow to travel in a direction of rotation of an internal component within the compressor motor housing.

Aspect 40. The method according to any of aspects 38-39, wherein the baseline flow is provided via an orifice having a fixed size.

Aspect 41. The method according to any of aspects 38-40, wherein the baseline flow is provided via leakage at a shaft seal of the compressor motor housing.

Aspect 42. The method according to any of aspects 38-41, wherein the automated expansion valve is an electronic expansion valve.

Aspect 43. The method according to any of aspects 38-41, wherein the automated expansion valve is a thermal expansion valve.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A compressor, comprising:
a volute housing;
a motor housing;
a metering device comprising:
an inlet configured to receive a flow of refrigerant, the flow of refrigerant being a portion of flow provided directly from the volute housing;
an orifice in direct fluid communication with an inside of the motor housing;
an automated expansion valve; and
a valve seat configured to receive the automated expansion valve, wherein the automated expansion valve and the valve seat control the flow of refrigerant through the orifice,
wherein the automated expansion valve is electrically connected to a controller to receive position information for the automated expansion valve, wherein the controller receives compressor operational parameter data, and determines a position of the automated expansion valve;
at least one bearing located within the motor housing;
a shaft seal; and
a compressor motor located within the motor housing;
wherein the flow of refrigerant and leakage from the shaft seal are configured to form a cooling flow that travels in a direction of rotation of an internal component within the compressor motor housing when the compressor motor is in operation.

2. The compressor of claim 1, wherein the metering device further comprises a fixed orifice configured to allow fluid communication between the cooling line and an inside of the motor housing.

3. The compressor of claim 1, wherein the metering device comprises a fixed flow path formed in the valve seat.

4. The compressor of claim 1, wherein the automated expansion valve is an electronic expansion valve.

5. The compressor of claim 1, wherein the automated expansion valve is a thermal expansion valve.

6. The compressor of claim 1, wherein the compressor is a multi-stage compressor.

7. The compressor of claim 1, wherein the compressor operational parameter data comprises a gas density within the motor housing.

8. The compressor of claim 1, wherein the compressor operational parameter comprises temperature data from within the motor housing.

9. A metering device comprising:
an inlet configured to receive a flow of refrigerant, the flow of refrigerant being a portion of flow provided directly from a volute housing of a compressor,
an orifice in direct fluid communication with an inside of a compressor motor housing,
an automated expansion valve,
a valve seat configured to receive the automated expansion valve, wherein the automated expansion valve and the valve seat control the flow of refrigerant through the orifice,
wherein the automated expansion valve is electrically connected to a controller to receive position information for the automated expansion valve, wherein the controller receives compressor operational parameter data, and determines a position of the automated expansion valve.

10. The metering device of claim 9, further comprising a second orifice having a fixed size.

11. The metering device of claim 9, wherein the valve seat is configured to allow a flow of refrigerant through the orifice when the automated expansion valve is in a fully extended position.

12. A method of providing refrigerant to an inside of a compressor motor housing, comprising:
providing a baseline flow of the refrigerant to the inside of the compressor motor housing, the baseline flow including a fixed flow at a metering device and shaft seal leakage, and
providing a variable flow of the refrigerant from a volute housing of a compressor to the inside of the compressor motor housing, wherein the variable flow of the refrigerant is controlled via an automated expansion valve,
wherein the automated expansion valve receives the refrigerant from a portion of flow provided directly from the volute housing of the compressor,
combining the baseline flow and the variable flow into a cooling flow, and
directing the cooling flow to travel in a direction of rotation of an internal component within the compressor motor housing.

13. The method of claim 12, wherein the fixed flow at the metering device is provided via an orifice having a fixed size.

14. The method of claim 12, wherein the automated expansion valve is an electronic expansion valve.

15. The method of claim 12, wherein the automated expansion valve is a thermal expansion valve.

16. A compressor, comprising:
a volute housing;
a motor housing;
a metering device comprising:
an orifice in direct fluid communication with an inside of the motor housing;
an automated expansion valve; and
a valve seat configured to receive the automated expansion valve, wherein the automated expansion valve and the valve seat control the flow of refrigerant through the orifice,
wherein the automated expansion valve is electrically connected to a controller to receive position information for the automated expansion valve, wherein the controller receives compressor operational parameter data, and determines a position of the automated expansion valve;
at least one bearing located within the motor housing;
a shaft seal; and
a compressor motor located within the motor housing,
wherein the metering device is located on a surface of the motor housing, and
the flow of refrigerant and leakage from the shaft seal are configured to form a cooling flow that travels in a direction of rotation of an internal component within the compressor motor housing when the compressor motor is in operation.

17. The compressor of claim 16, wherein the metering device further comprises a fixed orifice configured to allow fluid communication between a cooling line and an inside of the motor housing.

18. The compressor of claim 16, wherein the metering device comprises a fixed flow path formed in the valve seat.

* * * * *